(12) United States Patent
Tsuiki et al.

(10) Patent No.: US 6,502,087 B1
(45) Date of Patent: *Dec. 31, 2002

(54) WORK FLOW MANAGEMENT SYSTEM

(75) Inventors: Kazuyasu Tsuiki, Osaka (JP); Hiroshi Majima, Yokohama (JP); Hisashi Ono, Yokohama (JP); Kazuhiro Suga, Ibaraki (JP); Tetsuji Toge, Kobe (JP); Shunsuke Akifuji, Wako (JP)

(73) Assignee: Hitachi, Ltd., Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 09/592,556

(22) Filed: Jun. 12, 2000

Related U.S. Application Data

(63) Continuation of application No. 09/135,728, filed on Aug. 18, 1998, which is a continuation of application No. 08/531,652, filed on Sep. 21, 1995, now Pat. No. 5,940,829.

(30) Foreign Application Priority Data

Sep. 21, 1994 (JP) .............................................. 6-226257

(51) Int. Cl.$^7$ .............................................. G06F 17/30
(52) U.S. Cl. ...................... 707/1; 707/2; 707/3; 707/10; 707/100; 707/104; 707/201
(58) Field of Search .............................. 707/1, 10, 2, 3, 707/201, 100, 104; 705/9, 8, 7, 26

(56) References Cited

U.S. PATENT DOCUMENTS

| 4,503,499 A | 3/1985 | Mason et al. ................ 364/200 |
| 5,040,142 A | 8/1991 | Mori ........................... 395/772 |
| 5,125,075 A | 6/1992 | Goodale et al. ............ 395/200 |
| 5,182,705 A | 1/1993 | Barr et al. ................... 364/401 |

(List continued on next page.)

FOREIGN PATENT DOCUMENTS

| EP | 0272561 | 6/1988 |
| EP | 0438020 | 7/1991 |

(List continued on next page.)

OTHER PUBLICATIONS

The Nikkei Computer Magazine, No. 336, May 2, 1994, pp. 57–67 Bock, "TeamOffice from ICL TeamWare: finding the departmental groupware solution", The Workgroup Computing Report, Sep. 1994, vol. 17, No. 10, p. 3(18).

Marshak, "Rule–based messaging: using electronic mail as the vehicle for customized workflow applications", The Workgroup Computing Report, Oct. 1993, vol. 16, No. 10, p. 3(19).

(List continued on next page.)

*Primary Examiner*—Jean M. Corrielus
(74) *Attorney, Agent, or Firm*—Antonelli, Terry, Stout & Kraus, LLP

(57) ABSTRACT

A work flow management system has circulation control functions for carrying out branching, queuing, dividing, broadcasting, recovering, holding and substitute of a circulation material in the work flow system that carries out at automatic sequential circulation of electronic information. Thus, a work requiring a complex circulation control can be done by an electronic system. The work flow management system includes a circulation material sending and receiving unit which has functions of entering, sending, receiving, referencing and updating a circulation material for the users who are the subscribers of the work flow system, the circulation material defining unit which defines a circulation destination and the circulation control for the users who manage the work flow, and the circulation material control unit which circulates a circulation material in accordance with circulation definitions defined by the circulation material defining unit.

16 Claims, 16 Drawing Sheets

U.S. PATENT DOCUMENTS

| | | | |
|---|---|---|---|
| 5,311,595 A | 5/1994 | Bjerrum et al. | 380/25 |
| 5,355,304 A | 10/1994 | DeMoranville | 304/413.02 |
| 5,408,333 A | 4/1995 | Kojima et al. | 358/400 |
| 5,437,838 A | 8/1995 | DeMoranville | 422/67 |
| 5,463,735 A | 10/1995 | Pascucci et al. | 395/200.01 |
| 5,465,299 A | 11/1995 | Matsumoto et al. | 380/23 |
| 5,515,491 A | 5/1996 | Bates | 395/155 |
| 5,535,322 A | 7/1996 | Hecht | 395/155 |
| 5,548,506 A | 8/1996 | Srinivasen | 364/401 R |
| 5,555,299 A | 9/1996 | Maloney et al. | 379/212 |
| 5,581,691 A | 12/1996 | Hsu et al. | 395/182.12 |
| 5,623,653 A | 4/1997 | Matsuno | 395/609 |

FOREIGN PATENT DOCUMENTS

| | | |
|---|---|---|
| JP | 2184142 | 7/1990 |
| JP | 2278458 | 11/1990 |
| JP | 0477030 | 6/1992 |
| JP | 563728 | 3/1993 |

OTHER PUBLICATIONS

Yukita et al, "Unix Whitebook, Stationary Unix", McGraw–Hill Inc., Jul. 30, 1992, pp. 87–89.

Computer Communications, "Distributed system and Execution Model for Office Environments", A. Schill, vol. 14, No. 8, Oct. 1991.

*Proceedings of the Conference on Organization Computing-Systems*, Atlanta, Georgia, Nov. 5–8, 1991, "A Process Model and System for Supporting Collaborative Work", s. Sarin, et al., vol. 12, No. 2,3.

Wilson, et al., "Structure Planning: Deriving Project View", Software Engineering Journal, vol. 5, No. 2, pp. 138–148.

Dayao, et al., "Controlling Workflow in Groupware: Design and Operational Requirements, Methods and Strategies", release 1.0, vol. 92, No. 9, pp. 10–12.

Robert Mills, "Going with the Flow. (Workflow Management Systems for Engineering Organizations)(Special Report: Managing Engineering Data)" Computer–aided Engineering, vol. 13, No. 2, pp. psR12–psR17.

Compton, et al., Intelligent Validation and Routing of Electronic forms in a Distributed Workflow Environment:, Artificial Intelligence, pp. 125–131.

Schuster, et al., "A Client/Server Architecture for Distributed Workflow Management Systems", University of Erlangen, pp. 1–14.

Roger C. Parker, "Microsoft Office 4".

Dayao et al., "Superforms: A Security–Enhanced Smart Electronic form Management System", Globecom, '90, IEEE Global Telecommunication Concerning the Future, pp 1079.

Kovacs et al., "The Integration of product data and workflow management system in a large scale engineering database application", pp. 296–302, IDEAS '98 , International Jan. 1998.

Hwang et al., "Component and data distribution in a distributed workflow management system" pp. 244–251, Software Engineering Conference 1998.

Kong et al., "Transactional workflow for telecommunication service management", IEEE vol. 2, pp. 620–623, Jan. 1996.

F. Von Martial, "Design and Implementation of coordination and workflow management technology", APSEC '97 and ICSC '97 , pp. 538–539.

FIG.2 EXAMPLE OF WORK FLOW DEFINITION

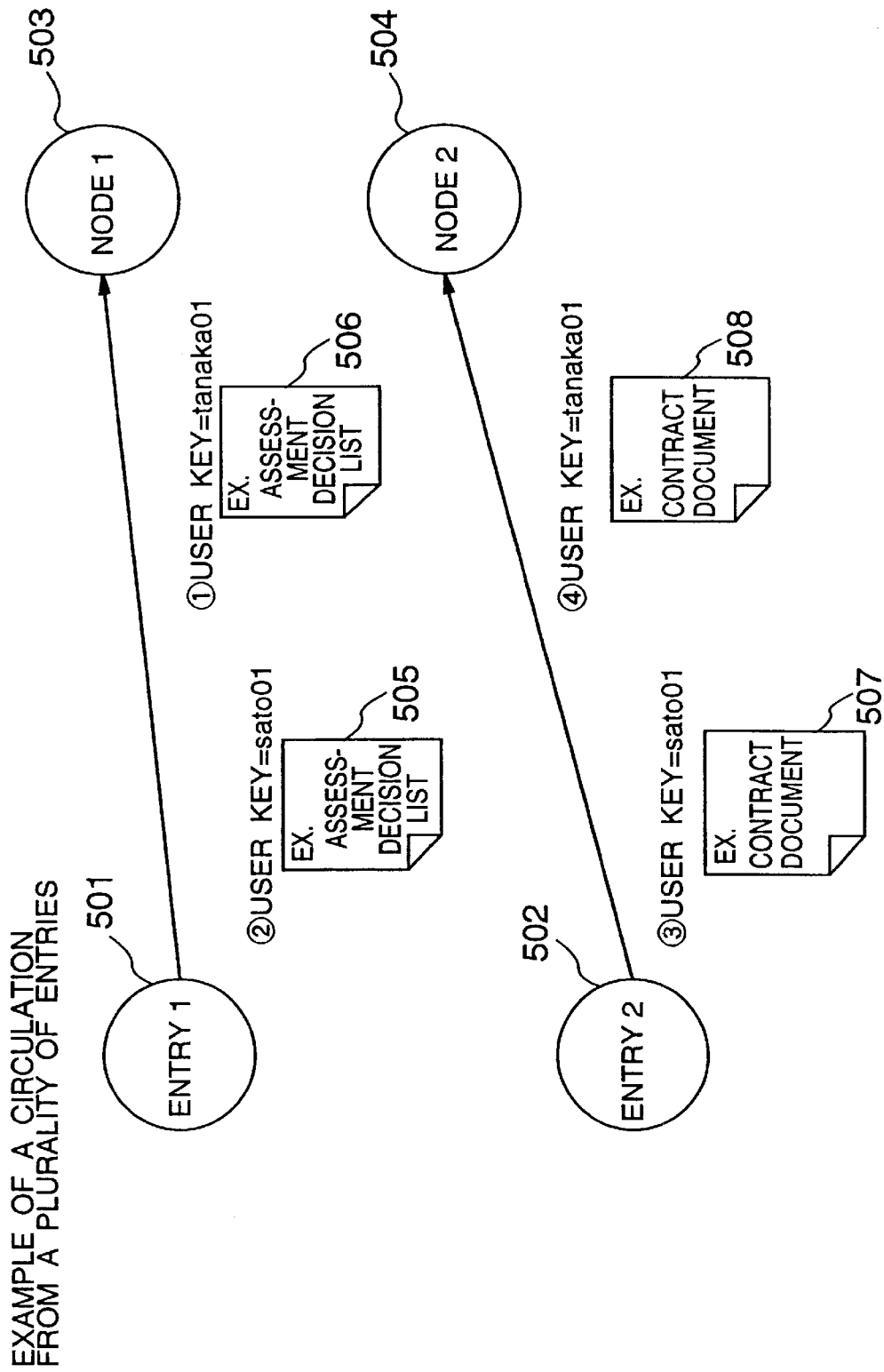

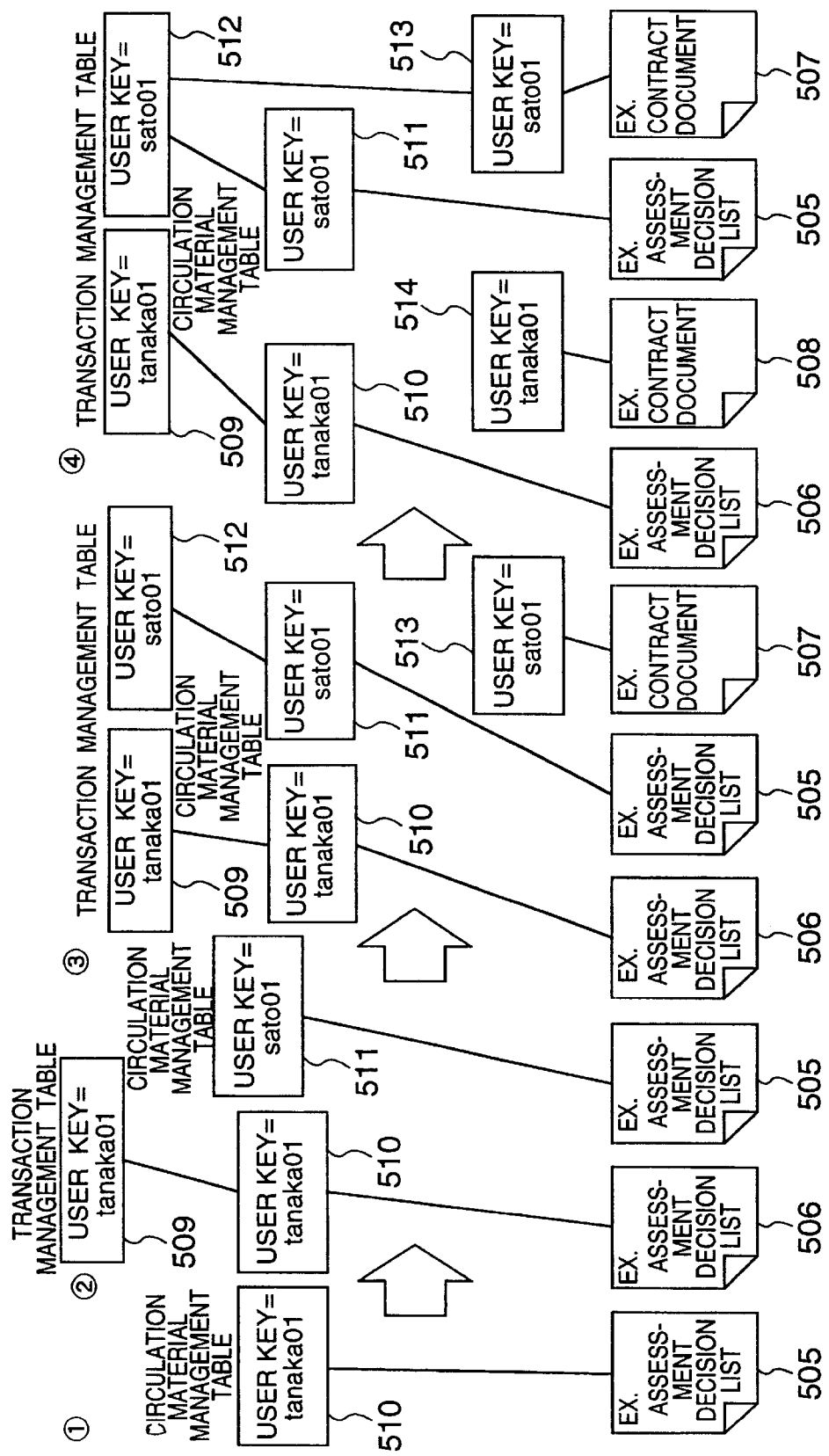

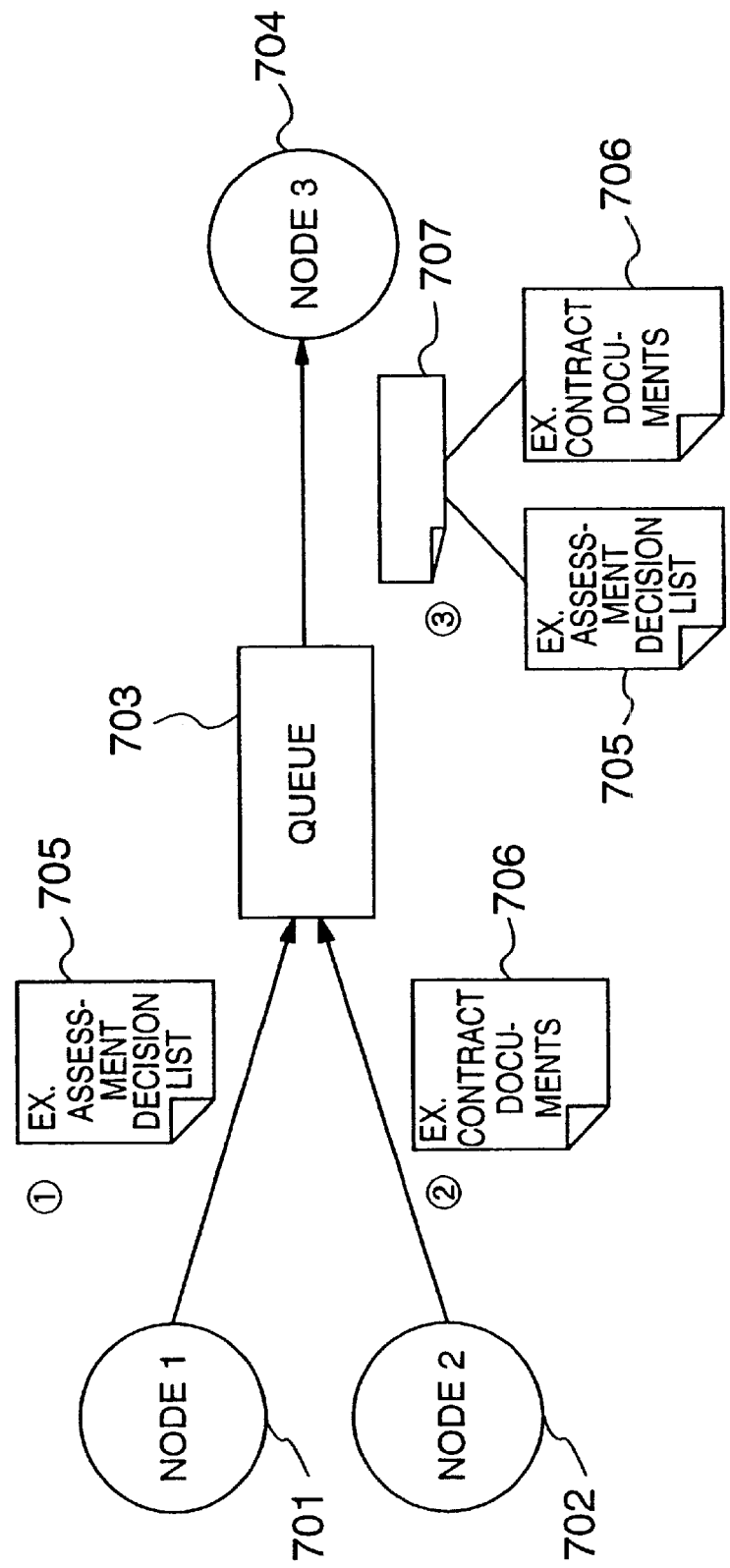

CHANGE WITHIN THE CIRCULATION CONTROL DATABASE

EXAMPLE OF A DIVIDE CIRCULATION DEFINITION

CHANGE WITHIN THE CIRCULATION CONTROL DATABASE

EXAMPLE OF A BROADCASTING CIRCULATION DEFINITION

CHANGE WITHIN THE CIRCULATION CONTROL DATABASE

EXAMPLE OF A RECOVERY CIRCULATION DEFINITION

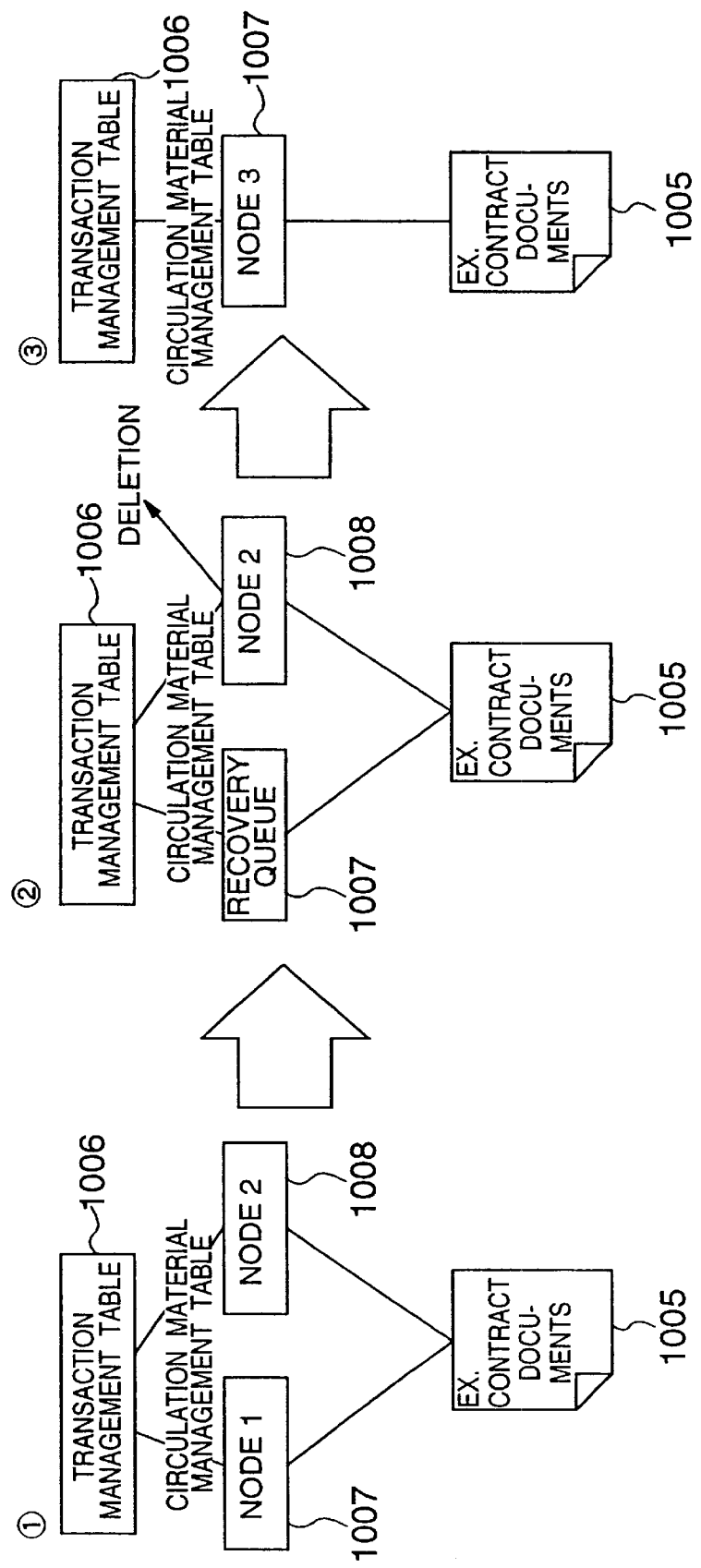

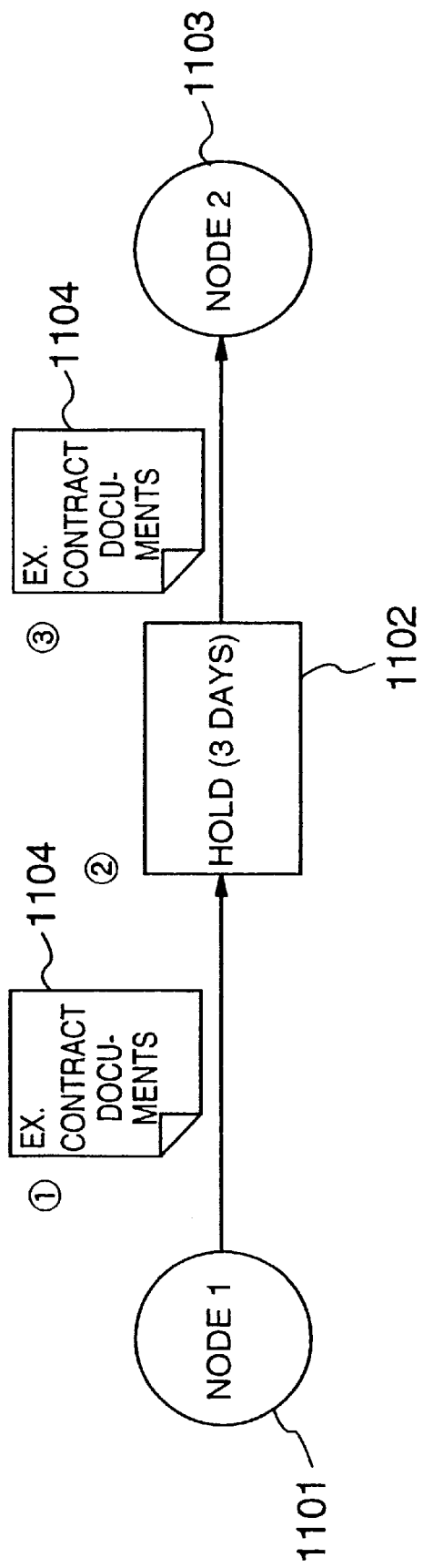

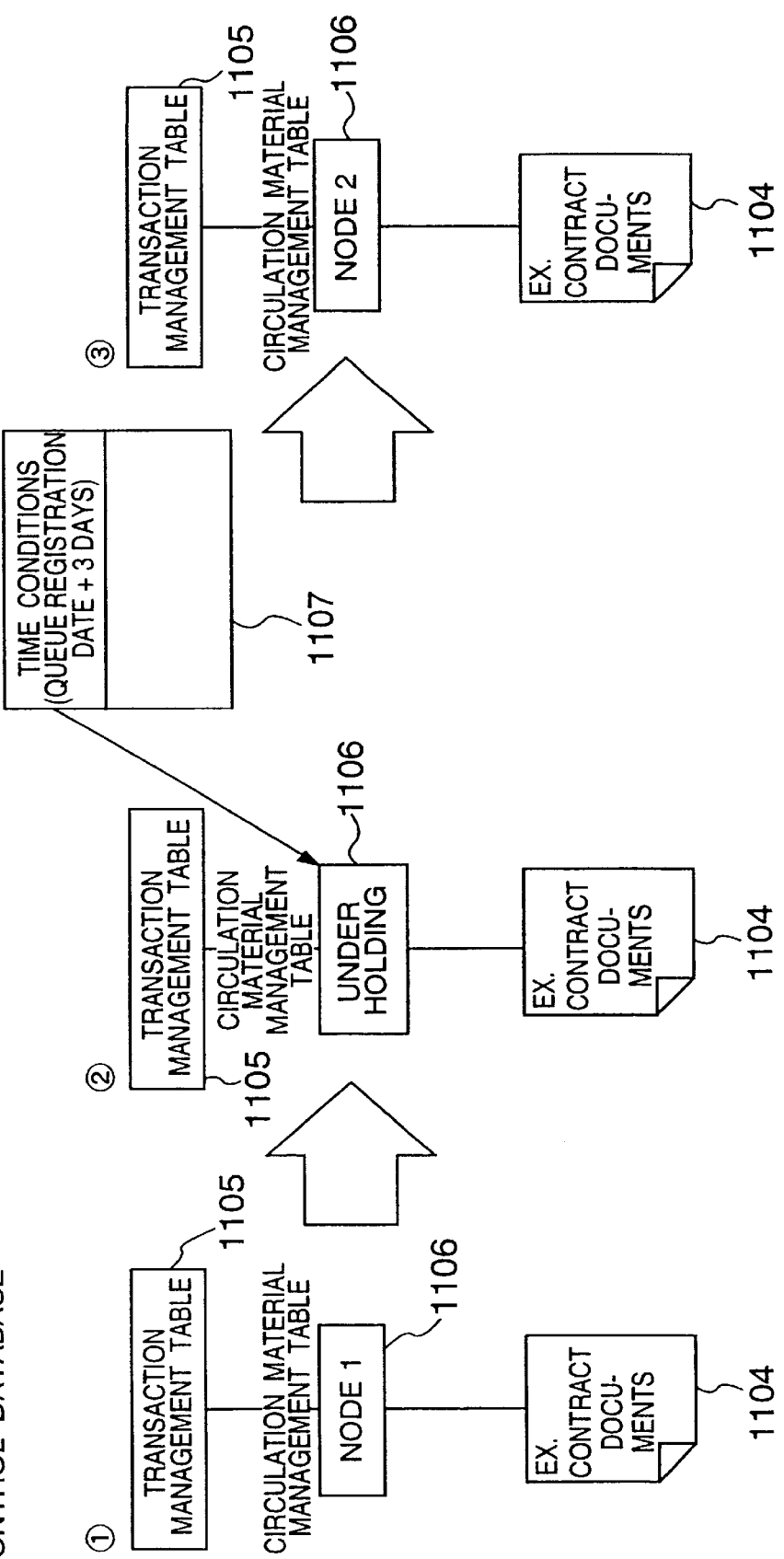

EXAMPLE OF A SUBSTITUTE CIRCULATION DEFINITION

WORK FLOW MANAGEMENT SYSTEM

This is a continuation of application Ser. No. 09/135,728, filed Aug. 18, 1998; which is a continuation of application Ser. No. 08/531,652, filed Sep. 21, 1995, now U.S. Pat. No. 5,940,829.

BACKGROUND OF THE INVENTION

The present invention relates to a work flow management system, more particularly to a work flow management system for controlling a work flow of a circulation of electronic documents sent from a plurality of senders according to a predetermined route.

The Nikkei Computer magazine, No. 336, issued on May 2, 1994 on pages 57 to 67, describes a work flow system which supports a work to be done jointly by a group of people. Further, the "The electronic mail circulation method and the electronic mail circulation system" disclosed in the JP-A-4-77030 is known in the art. According to the above-described work flow systems, source of generation of electronic documents is limited to only one place, and the systems are controlled such that a single document is circulated along a predetermined route.

According to the prior-art work flow systems, the source of generation of electronic documents is limited to only one place and a single document is circulated along a predetermined route. According to these methods, however, it has been difficult to apply the systems to a complex work which involves a plurality of sources of generation of electronic documents in the work flow for one work and which requires a circulation of these electronic documents collectively or which requires an allocated circulation of once-circulated electronic documents to different positions taking different job roles, etc. For example, as described later as an embodiment of the present invention with reference to FIG. 2, a complex work in the insurance assessment work involves an integration of documents from a plurality of generation sources of documents, such as application sheets from insurance applicants, medical certificates by doctors or investigation sheets by operators, and circulation of these documents in one, and further a change of assessment staff according to insurance amount and different procedures to be taken between an approved case and a non-approved case as a result of assessment.

It has been difficult to apply the conventional work flow systems to the above-described works because of the lack of the following functions in these systems.

(1) a function for defining a plurality of generation sources of documents, or senders.

(2) a function for integrating electronic documents sent from a plurality of senders into one circulation material.

(3) a function for dividing one circulation material into a plurality of circulation materials.

(4) a function for circulating a circulation material by branching to one of a plurality of circulation destinations according to the value of attribute records attached to the circulation material.

(5) a function for broadcasting a circulation material to a plurality of circulation destination and for recovering the broadcasted circulation material.

(6) a function for controlling the timing of circulating of a circulation material according to time conditions.

(7) a function for changing circulation destinations according to time conditions and status conditions.

SUMMARY OF THE INVENTION

It is an object of the present invention to provide a work flow management system which has the above-described control functions in a work flow system and which can cope with works having complex work flows.

In order to achieve the above object, a method according to the present invention for solving the above problems will be explained below.

A series of flow of electronic documents which is a circulation of electronic documents to a plurality of users to perform one work is called a work flow. When a process from an entry of an electronic document to an end of processing based on this work flow is handled as one work unit, this is called a transaction. According to the present invention, a work flow management system is provided which has a work flow defined and stored in advance in the storing unit and which efficiently circulates circulation materials from a plurality of circulation materials based on a work flow management technique that controls a sequential circulation of electronic documents from a circulation originator to circulation destinations by referring to the work flow definition. In order to achieve the above system, in the basic structure of the present invention, a circulation material management table is provided corresponding to each electronic document, and control data for showing a send request is linked with the circulation material management table and control data in a circulation tray is linked with the circulation management table by link information respectively so that the circulation is controlled by only changing the link information even if the circulation destinations are changed.

The operation of the above-described structure will be explained below. A relevant pointer between a send request queue, control data placed on a circulation tray and the circulation material management table is expressed by an inter-object link function. With this arrangement, it is possible to retrieve and update only the data which needs to be updated and it is possible to achieve a high-speed circulation control. Particularly, in the case of circulating circulation materials sent from a plurality of senders to one circulation destination by integrating these circulation materials together, it is possible to efficiently wait for circulation materials by providing a separate management table which is linked with the circulation material table that corresponds to each electronic document.

Other objects, features and advantages of the present invention will become apparent from the embodiments of the invention taken in conjunction with the accompanying drawings.

BRIEF DESCRIPTION OF THE DRAWINGS

FIGS. 4A and 4B are diagrams for showing examples of the entry of circulation materials from a plurality of entries.

FIGS. 6A and 6B are diagrams for showing examples of a queue processing.

FIGS. 9A and 9B are diagrams for showing examples of a recovery processing.

FIGS. 10A and 10B are diagrams for showing examples of a hold processing.

DESCRIPTION OF THE PREFERRED EMBODIMENTS

One embodiment of the present invention will be explained below with reference to drawings.

Figure 1:
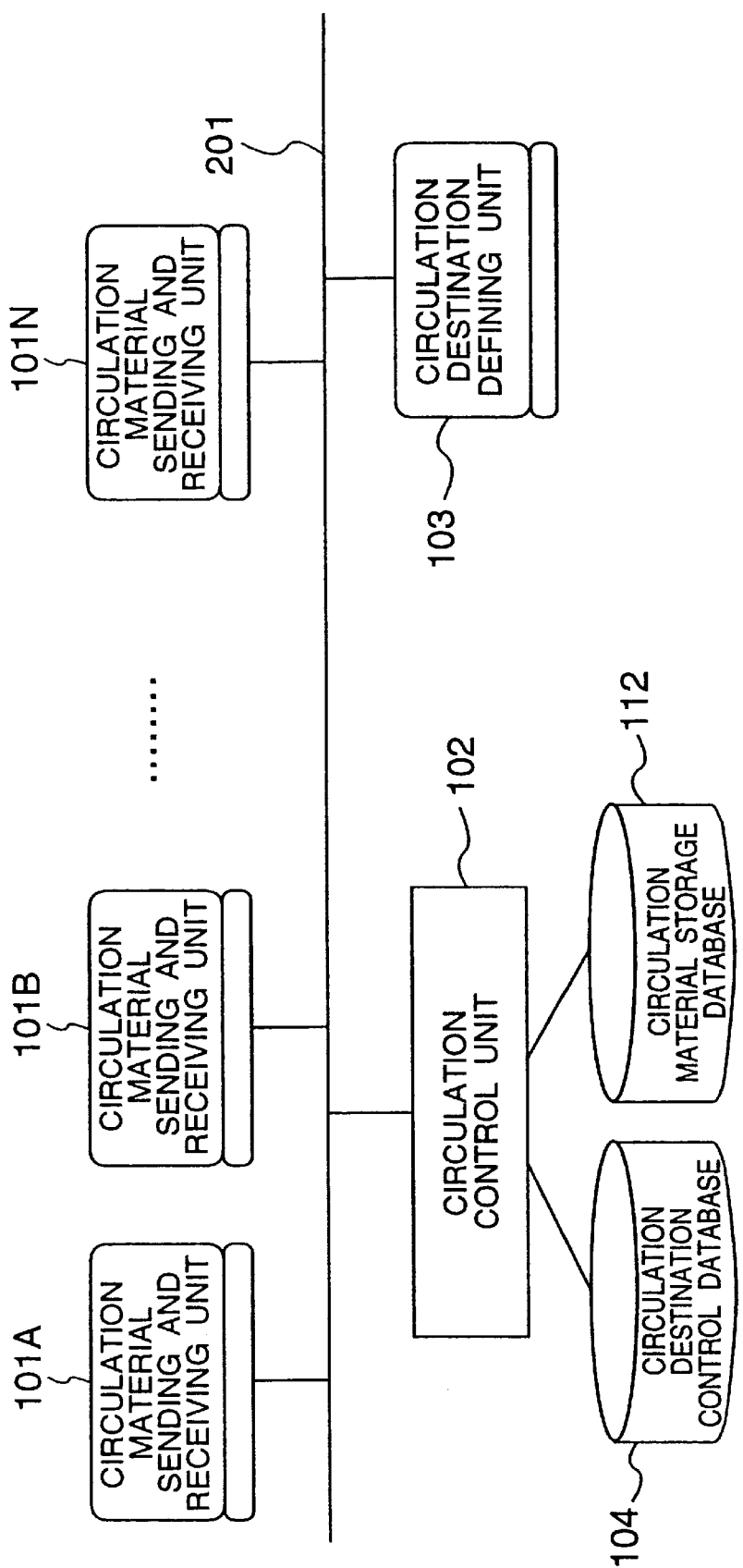
FIG. 1 is a diagram for showing an example of the configuration of the work flow management system according to the present invention.

FIG. 1 shows an example of the system configuration of the work flow management system. The system includes a plurality of circulation material sending and receiving units 101A, 101B, -, and 101N, a circulation material control unit 102, at least one circulation material defining unit 103, a LAN for mutually connecting the circulation material defining units, and a network 201 such as a public network. The circulation material sending and receiving units 101A to 101N have functions for entering, sending, receiving, referring to and updating a circulation material, and this circulation material sending and receiving unit 101 is used by subscriber users of the work flow. The circulation material defining unit 103 stores definitions of circulation destinations and work flow definitions including circulation control data, and sends the work flow definitions to the circulation material control unit 102. The work flow is defined in advance by the users and the result is stored in the circulation destination defining unit 103. The circulation material control unit 102 has a function for actually circulation a circulation material according to a circulation destination defined by the circulation destination defining unit 103. A database 104 and a database 112 are connected to the circulation material control unit 102. The database 104 stores circulation control databased on an object orientation, and the database 112 stores a substance of the circulation material.

Figure 2:
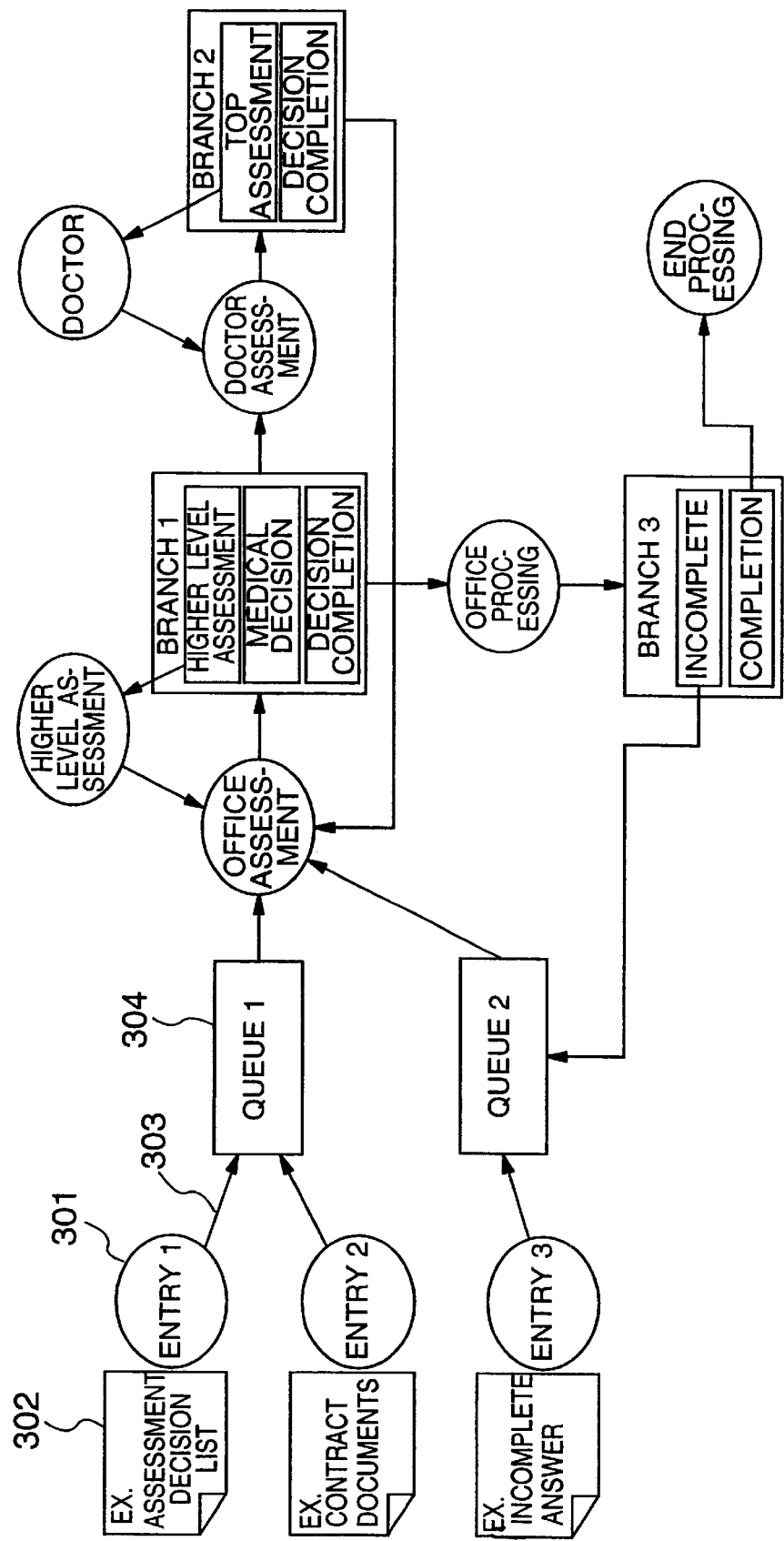
FIG. 2 is a diagram for showing work flow definition data.

FIG. 2 shows examples of the work flow definition data stored in the circulation material defining unit 103. The work flow definition data is the data for defining circulation destinations and a method for a circulation as shown in FIG. 2. In FIG. 2, a round mark 301 designates a circulation material sending and receiving unit, a block 304 designates circulation control data and an arrow mark 303 designates a circulation destination. A circulation material is entered from the sending and receiving unit 301 of "entry" The round mark 301 and the block 304 are collectively called nodes. These nodes are differentially called a control node and a processing node when it is necessary to discriminate between the 301 and 304. A dynamic flow of a work from the entry of a circulation destination data to an end of the processing of the circulation material based on the work flow definition data shown in FIG. 2 is a transaction. A technique of the work flow definition data is disclosed in the U.S. applications being filed based on the above-described Japanese Patent Application No. 6-226666, and this technique can be utilized.

Figure 3:
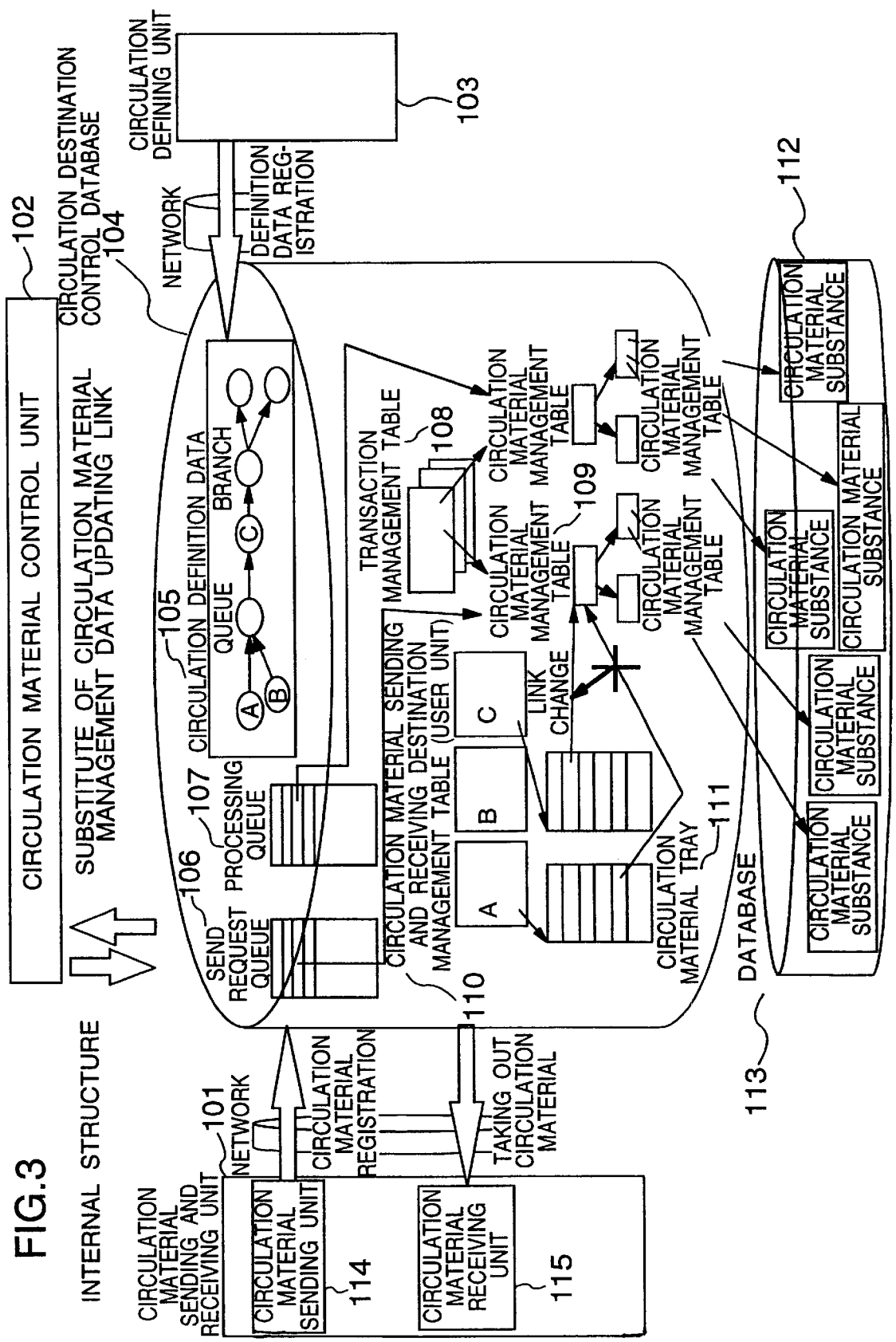
FIG. 3 is a diagram for showing an internal structure of the data flow management system.

FIG. 3 shows an example of the structure of the inside of the work flow management system 102. The basic operation of the system will be explained below with reference to FIG. 3.

(1) The circulation destination defining unit 103 stores the stored circulation definition data 105 in the database 104 within the circulation material control unit 102.

(2) When a circulation material has been entered to the circulation control unit 102 from the circulation material sending unit 114 within the circulation material sending and receiving unit 101, the circulation material control unit 102 registers the substance 113 of the circulation material in the database 112 and produces the circulation material management table 109 for this circulation material in the database 104. In this case, a plurality of electronic documents can be handled as one circulation material by linking the substance 113 of a plurality of circulation materials to one circulation material managing table 109. Further, the circulation material control unit 102 writes data for showing a send request to a send request queue 106 which has been set within the database 104. The data for showing a send request includes link information to the circulation material management table 109 so that what circulation material relating to what circulation material management table should be sent is made clear. The circulation material management table 109 has been set with link information for indicating the substance 113 of the circulation material, information for showing from what node the circulation material has been entered and key information for identifying the transaction. The node from which the circulation material has been entered can be obtained from the circulation definition data 105.

(3) The circulation material control unit 102 retrieves the send request queue 106 in a predetermined time interval and checks whether the send requested data has been registered in the send request queue 106. If the send requested data has been registered in the send request queue, the circulation material control unit 102 takes out the send request date from the send request queue 106, and retrieves the circulation material management table 109 linked to the link information attached to the send request data. Next, the circulation material control unit 102 compares the node information within the corresponding circulation material management table 109 with the circulation definition data 105 and determines the node of the next circulation destination. When the node of the circulation destination is the processing node for showing the next set circulation material sending and receiving unit 101, the circulation material control unit 102 writes data for pointing the corresponding circulation material management table 109 to a circulation material tray 111 provided for each circulation material sending and receiving unit 101. With this arrangement, the circulation material is sent to the next circulation destination. Thereafter, the circulation material control unit 102 updates the node information within the circulation material management table 109 from the circulation originator node to the circulation destination node, and deletes the corresponding send request data from the send request queue 106. Thus, the circulation control is finished. The circulation material control unit 102 carries out the processing of the next send request data within the send request queue 106. When there is no send request data in the send request queue 106, the circulation material control unit 102 waits for a send request from the circulation material sending and receiving unit 101.

(4) At the request from a user who operates the circulation material sending and receiving unit 101, a circulation material receiving unit 115 within the circulation material sending and receiving unit 101 retrieves the circulation material tray 111 of the corresponding circulation material sending and receiving unit 101. If there is data in the tray, this means that a circulation material has reached the user. The circulation material receiving unit 115 retrieves the circulation material management table 109 from the data in the tray and takes out the circulation material from the database 112. The user refers to the taken-out circulation material and updates the circulation material.

(5) The user finishes the operation of taking out the circulation material, and does the following processing for sending the circulation material to another circulation material sending and receiving unit 101. The user at first updates the substance 113 of the corresponding circulation material on the database 112 and reflects the user's operation result in the database 112. The circulation material sending and receiving unit 101 deletes the data relating to the corresponding circulation material from the circulation tray 111 and adds data for showing a send request to the send request queue 106 in order to send the circulation material to the other circulation material sending and receiving unit 101.

(6) As shown in (3) above, the circulation material control unit 102 is always monitoring the send request queue 106, and the above operation of the (3), (4) and (5) is repeated so that a circulation material is circulated.

Next, the operation of the work flow management system in the case of the circulating circulation materials entered from a plurality of entries under the management of one transaction will be explained below based on procedure examples shown in FIGS. 4A and 4B. FIGS. 4A and 4B show procedures of a processing in the case when a circulation material has been entered from a plurality of entries. In order to show that a circulation material belongs to one transaction, the circulation material sending and receiving unit 101 sets key information (called a user key) for identifying the transaction at the time of producing the circulation material management table 109. FIG. 4A shows an example that a user key, tanaka01, has been set to a circulation material 506 and a circulation material 508, and a user key, sato01, has been set to a circulation material 505 and a circulation material 507. The circulation material control unit 102 sets a transaction management table 108 for managing the transaction. The circulation control unit 102 refers to a user key set to the circulation material management table 109 of the entered circulation material and checks whether the transaction management table 108 having the same user key exists or not. If there is no transaction management table having the same user key, a new transaction management table 108 is produced and the circulation material management table 109 is linked to this new transaction management table 108. It there exists a transaction management table having the same user key, link information is set to this transaction management table 108. With the above arrangement, it is possible to manage in the database 104 the circulation material within the same transaction.

FIG. 4B shows the case that a circulation materials have been entered from an entry 1 (501) and an entry 2 (502) in the sequence of (1), (2), (3) and (4) respectively. When the circulation material 506 has been entered from the entry 1 (501) at (1), a circulation material management table 510 is produced within the database 104. In this case, a transaction management table has not yet been produced. Therefore, a transaction management table 509 is produced unconditionally. When a circulation material 505 has been entered from the entrance 1 (501) at (2), a corresponding circulation material management table 511 is produced. Thereafter, a transaction management table is retrieved, and existence of a transaction management table of which user key matches the user key of the circulation material management table is checked. Since thee is no transaction management table of which user key matches, a new transaction management table 512 is produced. Next, when a circulation material 507 has been entered from the entry 2 (502) at (3), a circulation material management table 513 is produced similarly, and a transaction management table is retrieved. In this case, since the transaction management table 512 having the same user key exists, link information is set between the transaction management table 512 and the circulation material management table 513. This is the same for the case where a circulation material 508 has been entered from the entry 2 (502) at (4).

A method for controlling a circulation material within the same transaction will be explained below based on several examples of processing.

Figure 5A:
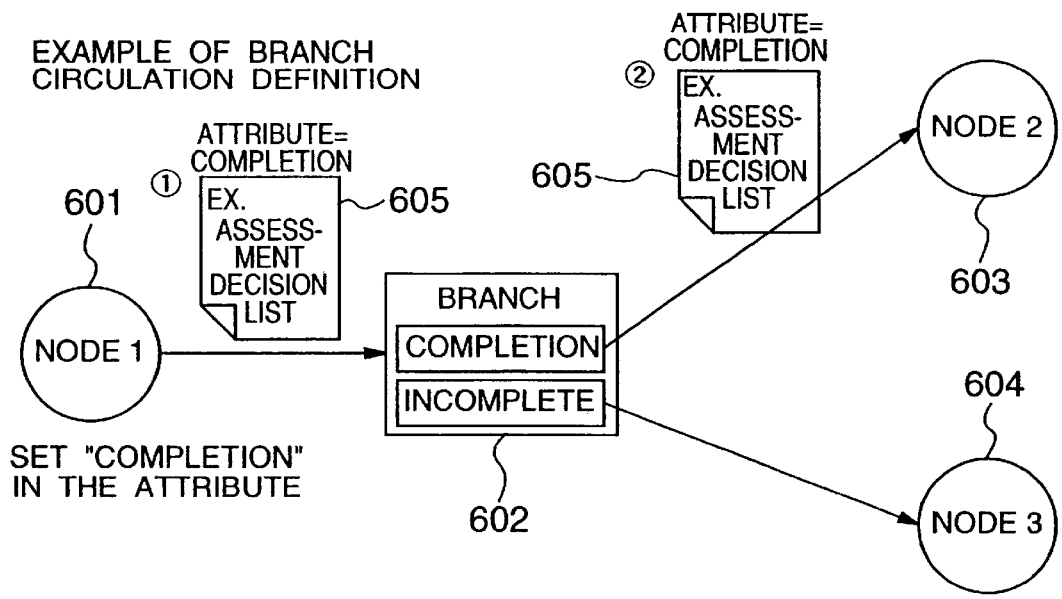
FIGS. 5A and 5B are diagrams for showing examples of a branch processing.
Figure 5B:
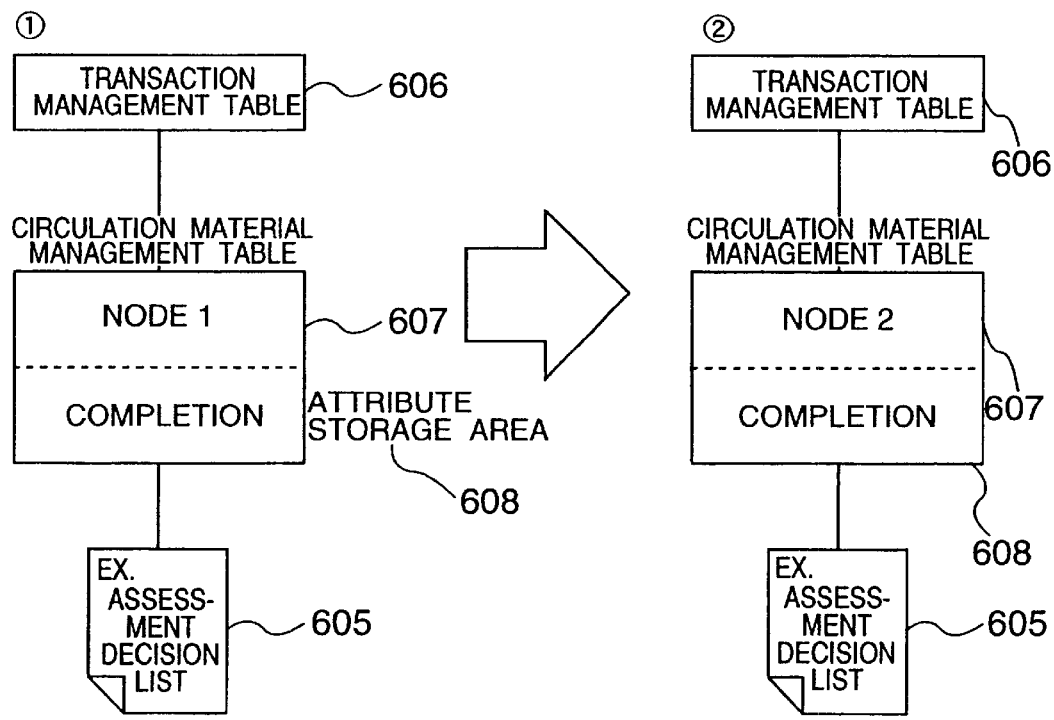

The operation of the system for a branch processing will be explained with reference to FIGS. 5A and 5B. A "branching" refers to a changing of a circulation destination based on an attribute added to the circulation material. Attributes are set by the circulation material sending and receiving unit 101 to an attribute storage area 608 provided within the circulation material management table 607. In the node 1 (601), when a user has set a certain value ("completion" is set in this case) as an attribute of a circulation material and the user has circulated this circulation material, this attribute value is set to the attribute storage area 608 within the circulation material management table 607. The circulation material control unit 102 refers to the attribute storage area 608 of the circulation material management table 607 by the control node 602 for branching which is the next circulation destination. Based on the judgement of the value of the attribute, the circulation material control unit 102 circulates the circulation material to a circulation destination (node 2 (603) in this case) which has been defined in advance by the data flow definition. Thereafter, the node information within the circulation material management table 607 is updated from the node 1 (601) to the node 2 (603). Further, when the user has set "incomplete" as an attribute of the circulation material and circulated the circulation material, the circulation material control unit 102 circulates the circulation material to a node 3 (604).

Figure 6B:
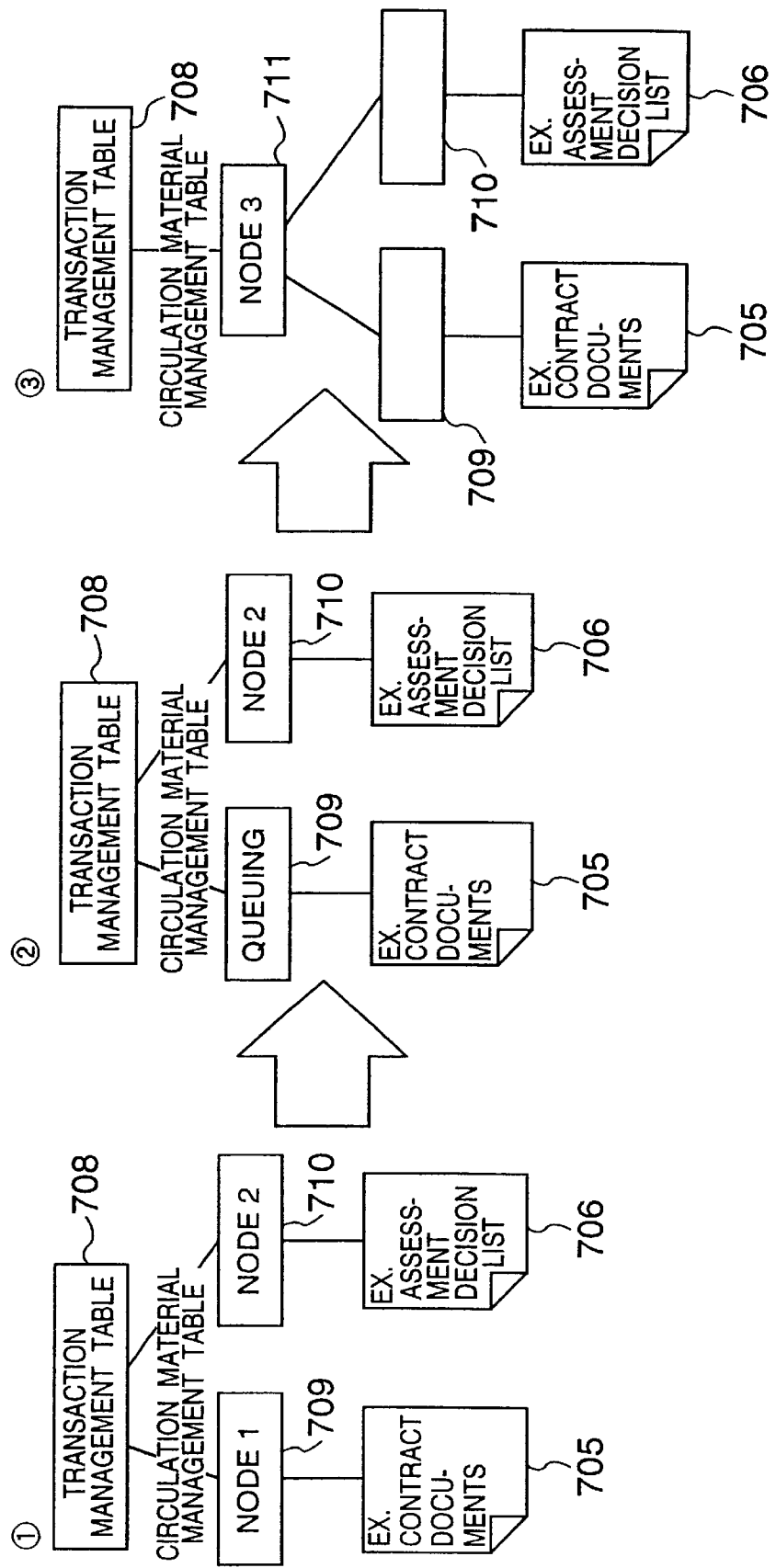

The operation of the system for a queuing processing will be explained below with reference to FIGS. 6A and 6B. A "queuing" refers to a collective circulation of a plurality of circulation materials to a next circulation destination. A first, a circulation material arrives at a queuing node 703 from a node 1 (701). In this case, the circulation material control unit 102 retrieves circulation material management tables 709 and 710 to be linked from a transaction management table 708, and checks whether other circulation materials have been arrived or not. If all other circulation material management tables are in the queuing state, other circulation materials are arriving. If not circulation materials have arrived yet (the case of (1)), the circulation material control unit 102 sets a flag for showing a queuing state in the corresponding node, to the circulation management table 709. At (2), when a circulation material has reached a queuing node 703 from the node 2 (702), the circulation material control unit 102 checks other circulation materials in the same manner. In the case of (2), thee is a circulation material 705 which is being waited in the corresponding node. Therefore, the circulation material control unit 102 adds a circulation material management table 711 for managing a plurality of circulation objects, to the higher order of the two circulation material management tables 709 and 710, and circulates the circulation materials 705 and 706 to the node 3 (704). The new circulation material management table 711 is provided in order to facilitate the processing of a plurality of circulation materials as one circulation material. The latter is called a route circulation material.

Figure 7A:
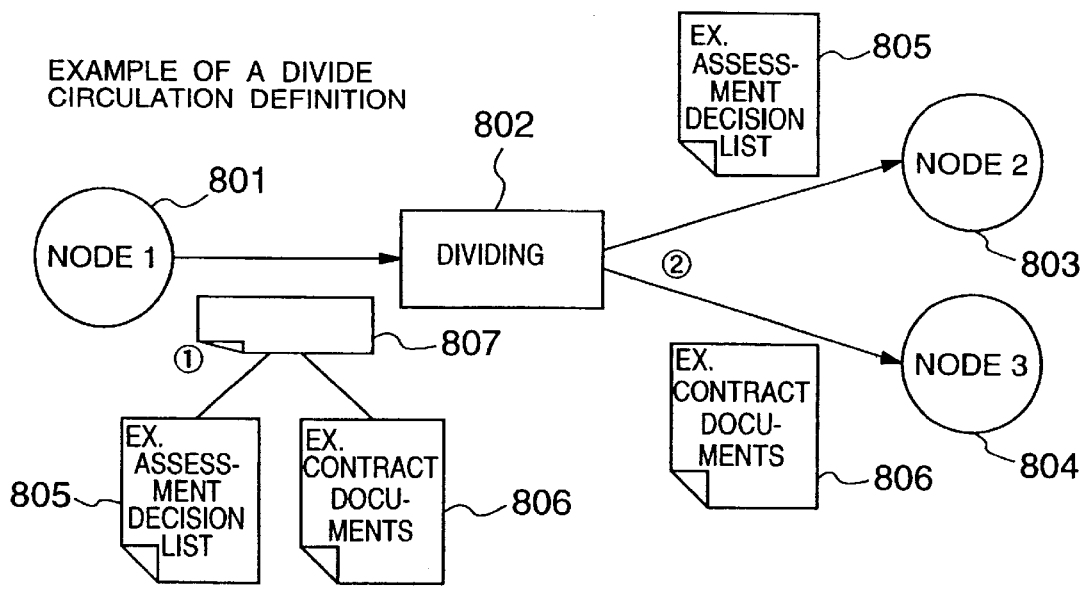
FIGS. 7A and 7B are diagrams for showing examples of a divide processing.
Figure 7B:
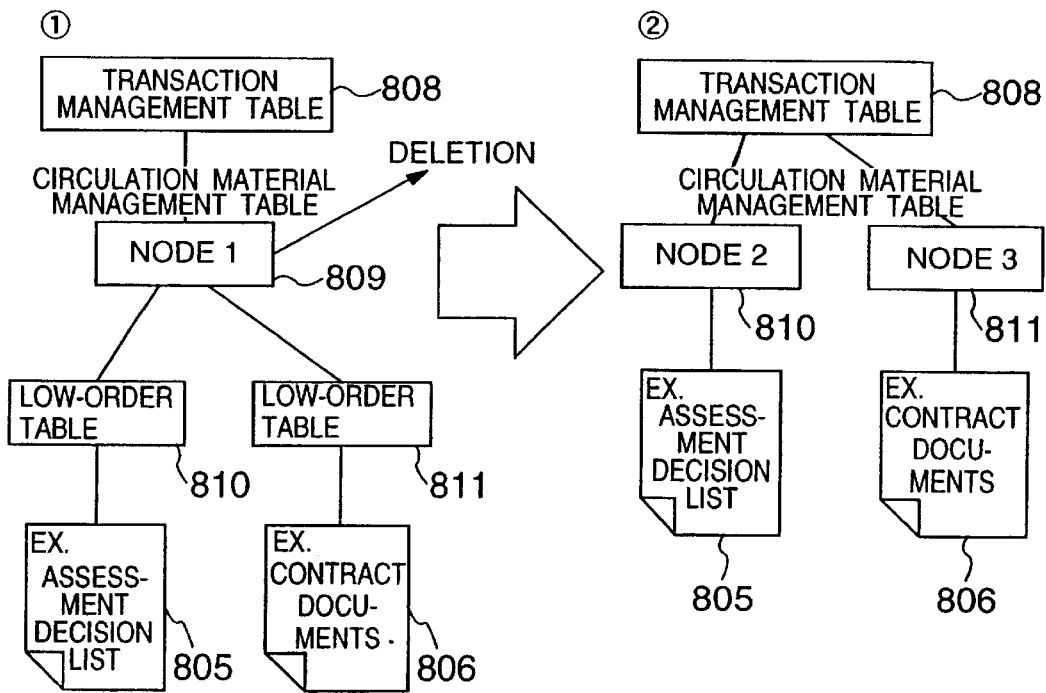

The operation of the system for a divide processing will be explained below with reference to FIGS. 7A and 7B. A "divide processing" refers to a processing of circulating circulation materials including a route circulation material generated by a queuing processing to different nodes by each circulation material. When circulation materials are circulated from a node 1 (801) to a node 802 for carrying out a dividing, the circulation material control unit 102 deletes a master circulation material management table 809 and directly links lower order circulation material management tables 810 and 811 to a transaction management table 808. Thereafter, the circulation material control unit 102 sets node names of the next circulation destinations 803 and 804 to circulation material management tables 810 and 811 respectively, and carries out the circulation. Thus, a divide processing of the circulation materials can be achieved.

Figure 8A:
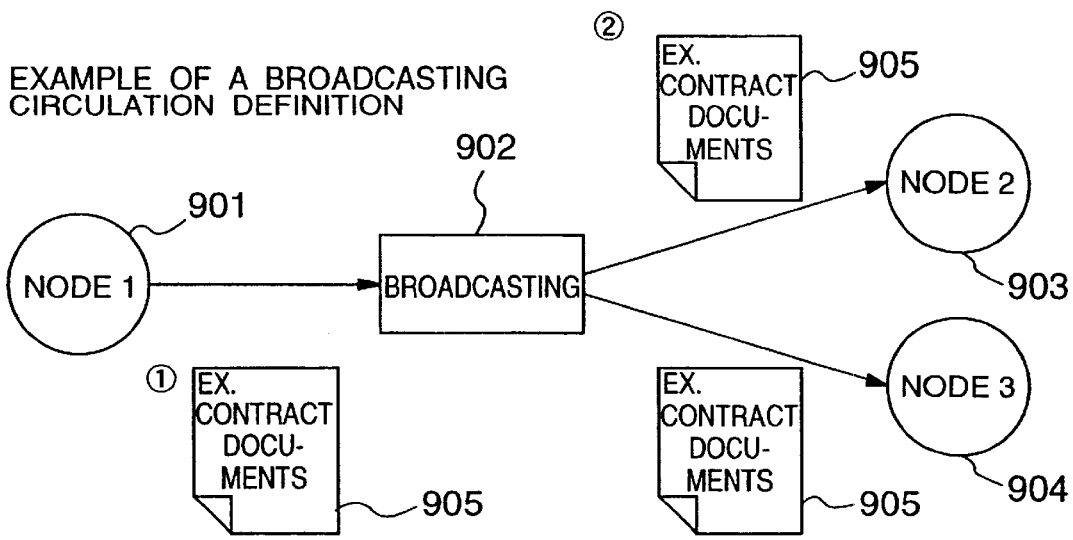
FIGS. 8A and 8B are diagrams for showing examples of a broadcasting processing.
Figure 8B:
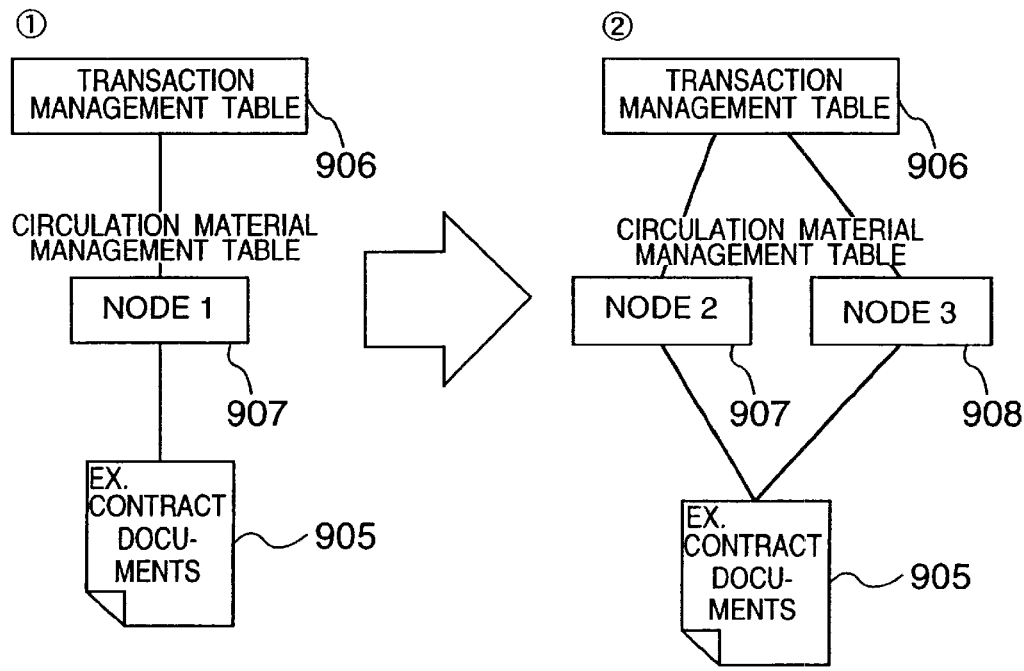

The operation of the system for a broadcasting processing will be explained below with reference to FIGS. 8A and 8B. A "broadcasting processing" refers to a processing of circulating the same circulation material to a plurality of nodes in parallel. When a circulation material has been circulated from a node 1 (901) to a node 902 for a broadcasting, the circulation material control unit 102 copies a circulation material management table 907 by the number of "the number of nodes to be broadcasted minus one" and produces a circulation material management table 908. The circulation material control unit 102 sets node names of the next circulation destination 903 and 904 within the circulation material management tables 907 and 908 respectively and carries out the circulation.

Figure 9A:
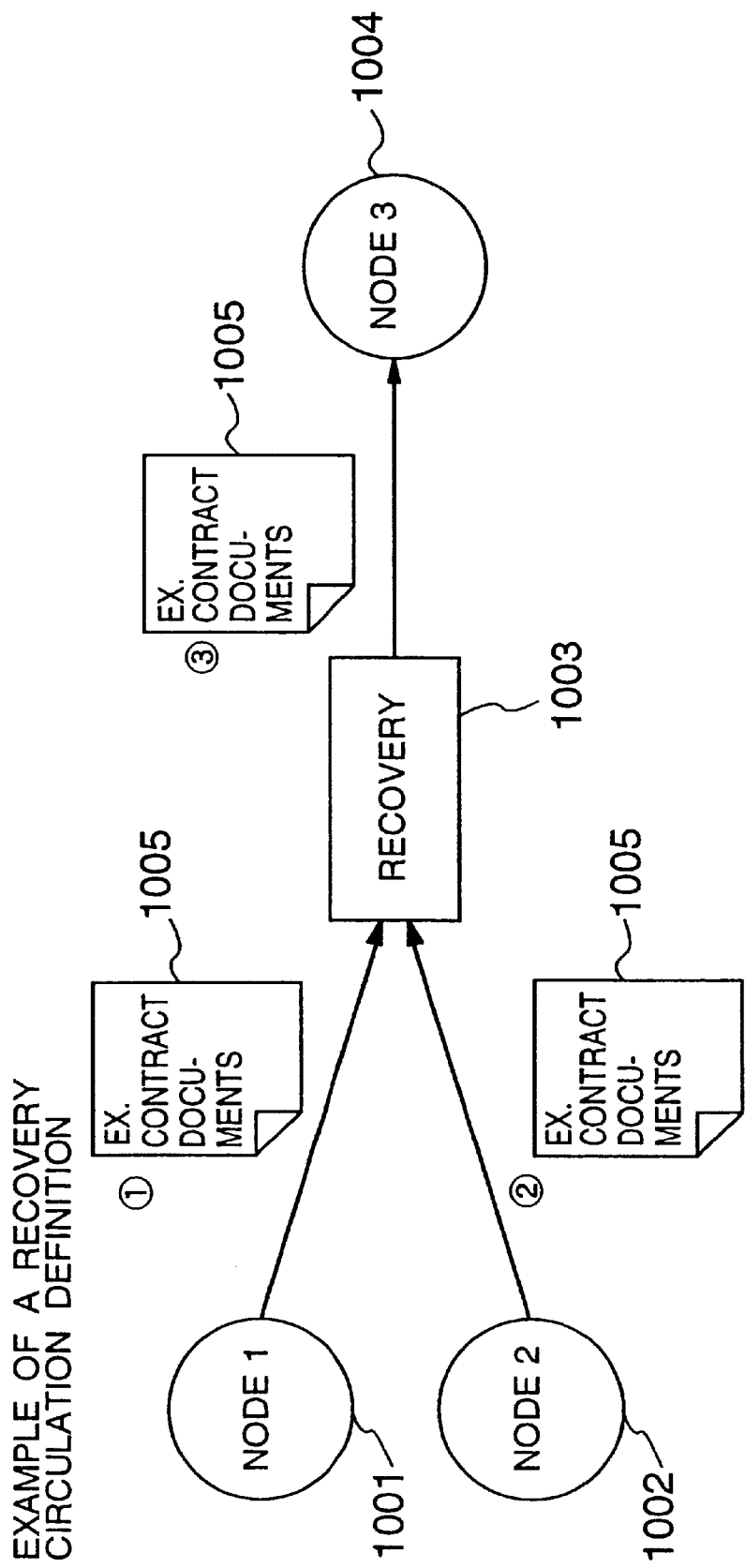

The operation of the system for recovering a circulation material will be explained below with reference to FIGS. 9A and 9B. A "recovery of a circulation material" refers to a processing of a broadcasted circulation material into one circulation material again. When a circulation material 1005 is circulated from a node 1 (1001) to a node 1003 for recovering the circulation material, the circulation material control unit 102 retrieves circulation material tables 1007 and 1008 linked from a transaction management table 1006, and checks whether all the circulation materials to be recovered are staying in the recovery node 1003. In other words, if other circulation material management tables 1008 are in the recovery status, other circulation materials are staying. In the case of (1), there is a circulation material management table 1008 for circulation materials not yet arrived in the recovery node 1003. Therefore, the circulation material control unit 102 sets a flag for showing that the circulation materials are under recovery by this node, to a circulation material management table 1007. When a circulation material has been circulated from a node 2 (1002) to the node 1003 for recovering the circulation material, the circulation material control unit 102 checks, in the same manner as in the case of (1), whether all the circulation materials to be recovered have arrived or not. In the case of (2), all the circulation materials have already arrived from other nodes. Therefore, the circulation material control unit 102 deletes unnecessary circulation material management tables 1008, and sets node names of the next circulation destinations and carries out the circulation.

The operation of the system for a hold processing will be explained below with reference to FIGS. 10A and 10B. A "holding of a circulation material" refers to a processing of controlling a timing for circulating a circulation material in accordance with time conditions. When a circulation material 1104 has been circulated from a node 1 (1101) to a node 1102 for holding the circulation material, the circulation material control unit 102 sets a flag for showing that the circulation material is being held, to a circulation material management table 1106. Further, the circulation material control unit 102 sets link information of the circulation material management table 1106 and wait conditions data, to a processing queue 1107. Thereafter, the circulation material control unit 102 retrieves the processing queue 1107 in a predetermined interval and checks time conditions. When the time conditions are satisfied, the circulation material control unit 102 sets a node name of the next circulation destination 1103 to the circulation material management table 1106 and carries out the circulation.

Figure 11A:
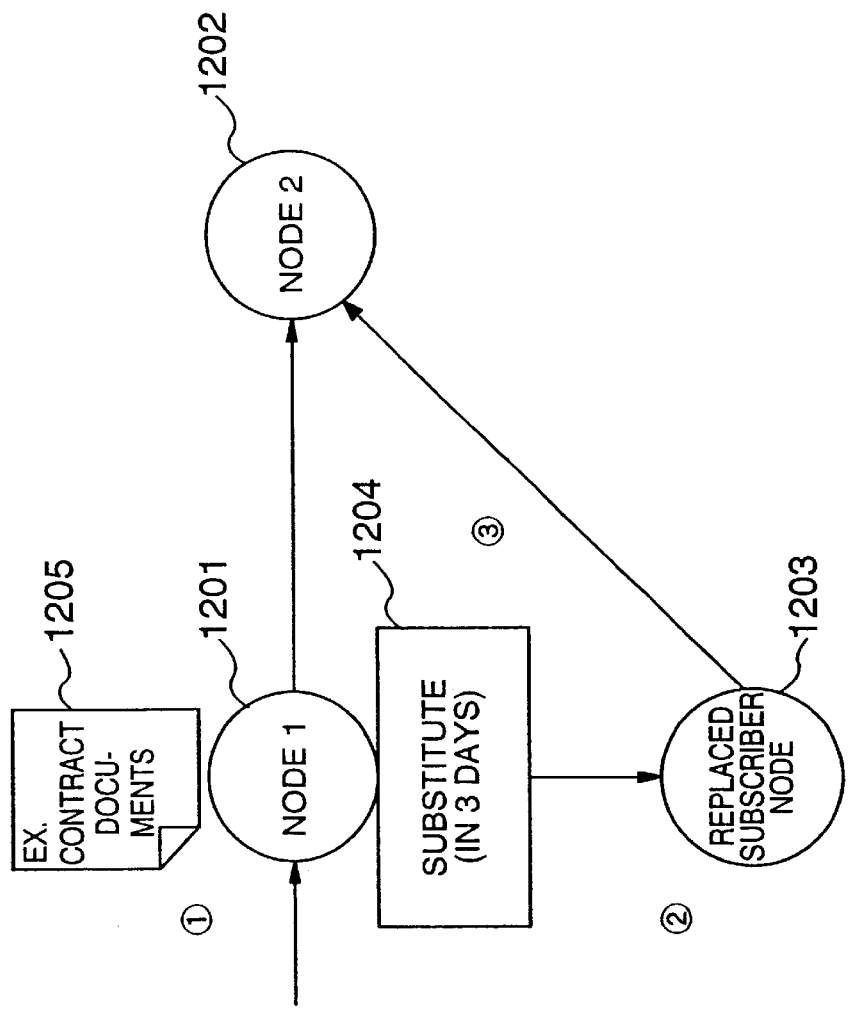
FIGS. 11A and 11B are diagrams for showing examples of a substitute processing.
Figure 11B:
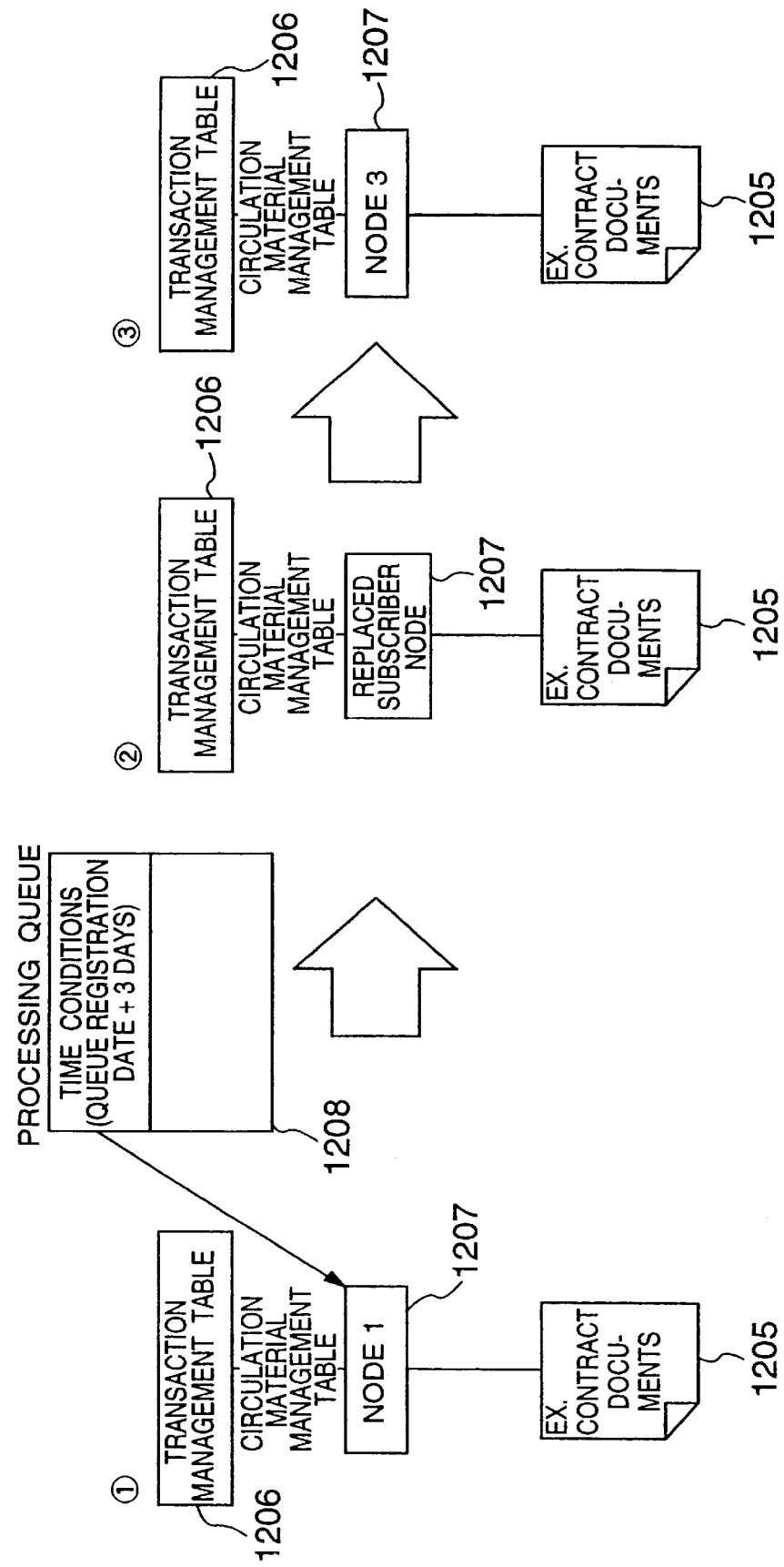

The operation of the system for a substitute processing will be explained below with reference to FIGS. 11A and 11B. A "substitute of a circulation material" refers to a changing of a circulation destination according to time conditions and status conditions. When a substitute 1204 has been assigned by a circulation definition of a node 1 (1201), the circulation material control unit 102 also registers in a processing queue 1208 at the time of circulating a circulation material 1205 to the node 1 (1201). In the same manner as in the case of the hold processing, the circulation material control unit 102 retrieves the processing queue 1208 at every predetermined time period and judges the set conditions, If the conditions have been satisfied, the circulation material control unit 102 changes the circulation destination to a substitute node 1203, and carries out the circulation. If the circulation material is to be circulated from the node 1 (1201) to the next node 2 (1202) before the conditions have not been satisfied, the circulation material control unit 102 deletes data from the processing queue 1208, cancels the processing queue, and circulates the circulation material to the next mode 1202. FIG. 11B shows a change in the database for circulation control.

As explained above, according to the work flow management system of the present invention, the system has circulation control data within the database and can have various functions of queuing, dividing, broadcasting, recovering, holding and substitute as the circulation control processing. Accordingly, it is possible to automate a complex work of the circulation control which it has been difficult to achieve by the prior-art techniques.

Further, since it is possible to achieve a correction of the circulation control by storing the circulation material in the database and by only changing the circulation control data, re-entering or a transfer of the circulation material is not actually required. Accordingly, it is possible to reduce the processing time or overhead of the circulation control.

What is claimed is:

1. An electronic document forwarding control system comprising:

a predefined computer including a pre-stored work flow definition for forwarding an electronic document forwarded from a source to a destination, a flow of said electronic document being such that said electronic document is forwarded along a route coupling said source and said destination, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said predefined computer executes processing based on said pre-stored work flow definition.

2. An electronic document forwarding control system comprising:

a predefined computer refers to a pre-stored work flow definition which is defined as a forwarding of an electric document forwarded from a source to a destination in response to a forwarding request and forwards said electronic documents to said destination, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destination each being a process included in said work flow definition.

3. An electronic document forwarding control system comprising:

a predefined computer including a pre-stored work flow definition for forwarding a plurality of electronic documents from a source to a destination, a flow of said electronic documents being such that said electronic documents are forwarded along a route coupling said source and said destination, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said predefined computer executes processing based on said pre-stored work flow definition.

4. An electronic document forwarding control system comprising:

a predefined computer refers to a pre-stored work flow definition which is defined an electric document forward from source to a destination in response to a forwarding request of said electronic documents from the source to ascertain that said electronic documents are collected all together, selects a relevant destination and forwards said electronic documents to a relevant destination, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destination each being a process included in said work flow definition.

5. An electronic document forwarding control system comprising:

a predefined computer having a pre-stored work flow definition including an electronic document forwarded from a source and a plurality of forwarding destinations, a flow of said electronic document being such that said electronic document is forwarded along routes coupling said source and said destination, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said predefined computer executes processing based on said pre-stored work flow definition.

6. An electronic forwarding control system comprising:

a predefined computer which refers to a pre-stored work flow definition defining forwarding of an electronic document from a source to a plurality of forwarding destinations in response to a forwarding request from the source to select a relevant one of said destinations, and forwards said electronic document to said relevant one destination, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destination each being a process included in said work flow definition.

7. An electronic document forwarding control system comprising:

a predefined computer having a pre-stored work flow definition including a plurality of electronic documents forwarded from a source and a plurality of destinations corresponding to respective ones of said electronic documents, a flow of said documents being such that said electronic documents are forwarded along routes coupling said source and said destinations, said source and said destinations each being a process included in said work flow definition, wherein said work flow definition includes at least two of a queuing process for queuing documents of circulation material until all documents of the circulation material have arrived, a dividing process for dividing documents of a circulation material so that the divided documents following a different route, and a recovery process for recovering all documents divided from a circulation material so that the circulation material again includes all documents originated from the circulation material, and wherein said predefined computer executes processing based on said pre-stored work flow definition.

8. An electronic document forwarding control system comprising:

a predefined computer which refers to a pre-stored work flow definition defining a forwarding of electronic documents forwarded from a source to a plurality of destinations in response to a forwarding request from said source to forward said electronic documents to the destinations corresponding thereto, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destinations each being a process included in said work flow definition.

9. An electronic document forwarding control system comprising:

a predefined computer including a pre-stored work flow definition for forwarding at least an electronic document from at least a source to a plurality of destinations, a flow of said electronic document being such that said electronic document is forwarded along routes coupling said source and said destinations, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said predefined computer executes a forwarding process based on said pre-stored work flow definition.

10. An electronic document forwarding control system comprising:

a predefined computer including a pre-stored work flow definition including a time condition for forwarding an electronic document from a source to a destination, a flow of said electronic document being such that said electronic document is forwarded along a route coupling said source and said destination, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said predefined computer executes a forwarding process based on said pre-stored work flow definition.

11. An electronic document forwarding control system comprising:

a predefined computer which refers to a pre-stored work flow definition which includes a time condition for forwarding an electronic document from a source to a destination in response to a forwarding request from said source when said time condition is satisfied, and forwards said electronic document to said destination in response to the forwarding request when the time condition has been satisfied, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destination each being a process included in said work flow definition.

12. An electronic document forwarding control system comprising:

a predefined computer including a pre-stored work flow definition including a first destination of an electronic document forwarded from a source, a second destination of an electronic document in substitution of said first destination and a condition for changing the destination of said electronic document from said first destination to said second destination, a flow of said electronic document being such that said electronic document is forwarded along a route coupling said source and said destination, said source and said destination each being a process included in said work flow definition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation again includes all documents originated from the circulation material, and wherein said predefined computer executes a forwarding process based on said pre-stored work flow definition.

13. An electronic document forwarding control system comprising:

a predefined computer which refers to said pre-stored work flow definition in response to a forwarding request of said from a source, to refer to a condition before forwarding said electronic document to a first destination, and changes said destination of said electronic document from said first destination to a second destination based on said condition, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material, and wherein said source and said destination each being a process included in said work flow definition.

14. A computer program stored on a computer-readable storage medium for implementing an electronic document forwarding control operation using a predefined computer, said computer program when executed causes said predefined computer to perform the steps of;

providing in said predefined computer, a work flow definition for forwarding an electronic document from a source to a destination, a flow of said electronic document being such that said electronic document is forwarded along a route coupling said source and said destination, said source and said destination each being a process included in said work flow definition; and referring to said pre-stored work flow definition in response to a forwarding request from the source to select a destination and forwarding said electronic document to said destination, wherein said work flow definition includes at least two of a queuing process for queuing documents of circulation material until all documents of the circulation material have arrived, a dividing process for dividing documents of a circulation material so that each of the divided documents following a different route, and a recovery process for recovering all documents divided from a circulation material so that the circulation material again includes all documents originated from the circulation material.

15. A method of controlling forwarding of an electronic document comprising the steps of:

providing in a predefined computer a pre-stored work flow definition for forwarding an electronic document from a source to a destination, a flow of said electronic document being such that said electronic document is forwarded along a route coupling said source and said destination, said source and said destination each being a process included in said work flow definition; and referring to said pre-stored work flow definition in response to a forwarding request of an electronic document from said source to select a destination and forward said electronic document to said destination, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material.

16. A method of controlling forwarding of an electronic document comprising the steps of:

providing in a predefined computer a pre-stored work flow definition for forwarding a plurality of electronic documents from a source to a destination, a flow of said electronic documents being such that said electronic documents are forwarded along a route coupling said source and said destination, said source and said destination each being a process included in said work flow definition; and referring to said pre-stored work flow definition in response to a forwarding request of said electronic documents from said source to ascertain that said electronic document are all collected together and select a relevant destination, and forward said electronic documents to said relevant destination, wherein said work flow definition includes at least two of a queuing process for queuing documents of circulation material until all documents of the circulation material have arrived, a dividing process for dividing documents of a circulation material so that each of the divided documents follow a different route, and a recovery process for recovering all documents divided from a circulation material so that the circulation material again includes all documents originated from the circulation material.

* * * * *